US008716378B2

(12) United States Patent
Ding et al.

(10) Patent No.: US 8,716,378 B2
(45) Date of Patent: May 6, 2014

(54) FLAME RESISTANT POLYESTER COMPOSITIONS, METHOD OF MANUFACTURE, AND ARTICLES THEREOF

(75) Inventors: Tianhua Ding, Newburgh, IN (US); Rodney Fonseca, Newburgh, IN (US); Sung Dug Kim, Newburgh, IN (US); Chris van der Weele, Sommelsdijk (NL)

(73) Assignee: Sabic Innovative Plastics IP B.V. (NL)

( * ) Notice: Subject to any disclaimer, the term of this patent is extended or adjusted under 35 U.S.C. 154(b) by 362 days.

(21) Appl. No.: 12/826,013

(22) Filed: Jun. 29, 2010

(65) Prior Publication Data

US 2011/0319536 A1    Dec. 29, 2011

(51) Int. Cl.
*C08K 5/3492*    (2006.01)
*C08K 5/53*    (2006.01)
*C08K 3/34*    (2006.01)
*C08L 67/02*    (2006.01)

(52) U.S. Cl.
USPC ........... 524/101; 524/100; 524/123; 524/504; 523/201; 523/210

(58) Field of Classification Search
USPC ........... 524/100, 101, 123, 504; 523/201, 210
See application file for complete search history.

(56) References Cited

U.S. PATENT DOCUMENTS

| | | | |
|---|---|---|---|
| 2,465,319 A | 3/1949 | Whinfield et al. |
| 3,047,539 A | 7/1962 | Pengilly |
| 3,671,487 A | 6/1972 | Abolins |
| 3,855,277 A | 12/1974 | Fox |
| 3,953,394 A | 4/1976 | Fox et al. |
| 3,953,404 A | 4/1976 | Borman |
| 4,096,156 A | 6/1978 | Freudenberger et al. |
| 4,141,927 A | 2/1979 | White et al. |
| 4,161,498 A | 7/1979 | Bopp |
| 4,180,494 A | 12/1979 | Fromuth et al. |
| 4,254,011 A | 3/1981 | Bier |
| 4,264,487 A | 4/1981 | Fromuth et al. |
| 4,504,613 A | 3/1985 | Abolins et al. |
| 4,506,043 A | 3/1985 | Ogawa et al. |
| 4,609,680 A | 9/1986 | Fujita et al. |
| 4,940,745 A | 7/1990 | Lausberg et al. |
| 4,954,540 A | 9/1990 | Nakane et al. |
| 4,983,660 A | 1/1991 | Yoshida et al. |
| 5,115,016 A | 5/1992 | Dickens et al. |
| 5,162,424 A | 11/1992 | de Boer et al. |
| 5,189,099 A | 2/1993 | Arnold-Mauer et al. |
| 5,221,704 A | 6/1993 | Shimotsuma et al. |
| 5,326,806 A | 7/1994 | Yokoshima et al. |
| 5,385,970 A | 1/1995 | Gallucci et al. |
| 5,413,681 A | 5/1995 | Trustin et al. |
| 5,451,611 A | 9/1995 | Chilukuri et al. |
| 5,684,071 A | 11/1997 | Mogami et al. |
| 5,882,780 A | 3/1999 | Yamamura et al. |
| 5,955,565 A | 9/1999 | Morris et al. |
| 5,962,587 A | 10/1999 | Gaggar et al. |
| 6,013,707 A | 1/2000 | Kleiner et al. |
| 6,068,935 A | 5/2000 | Hayami et al. |
| 6,111,031 A | 8/2000 | Puyenbroek et al. |
| 6,150,473 A | 11/2000 | Brown et al. |
| 6,162,837 A | 12/2000 | Gerking et al. |
| 6,166,114 A | 12/2000 | Cosstick et al. |
| 6,255,371 B1 | 7/2001 | Schlosser et al. |
| 6,410,607 B1 | 6/2002 | Ekart et al. |
| 6,420,459 B1 | 7/2002 | Horold |
| 6,429,243 B1 | 8/2002 | Okamoto et al. |
| 6,433,045 B1 | 8/2002 | Hanabusa et al. |
| 6,469,095 B1 | 10/2002 | Gareiss et al. |
| 6,503,988 B1 | 1/2003 | Kitahara et al. |
| 6,518,322 B1 | 2/2003 | West |
| 6,531,530 B2 | 3/2003 | Asano |
| 6,538,054 B1 | 3/2003 | Klatt et al. |
| 6,547,992 B1 | 4/2003 | Schlosser et al. |
| 6,569,928 B1 | 5/2003 | Levchik et al. |
| 6,569,957 B2 | 5/2003 | Williams et al. |
| 6,642,288 B1 | 11/2003 | Hulskotte |
| 6,716,899 B1 | 4/2004 | Klatt et al. |
| 6,794,463 B2 | 9/2004 | Aramaki et al. |
| 6,887,909 B2 | 5/2005 | Kawamura et al. |

(Continued)

FOREIGN PATENT DOCUMENTS

| | | |
|---|---|---|
| DE | 19904814 A1 | 8/2000 |
| EP | 0146104 A2 | 12/1984 |

(Continued)

OTHER PUBLICATIONS

UL 94, "Tests for Flammability of Plastic Materials for Parts in Devices and Appliances"; 52 pages; Dec. 12, 2003.
Chemical Processing, [online]; [retrieved on Oct. 14, 2009]; retrieved from the Internet http://www.chemicalprocessing.com/industrynews/2006/056.html Article: "GE gives plastic bottle recycling a new spin," Chemical Processing.com, Aug. 26, 2006, 2pgs.
J. Cooper et al., "Life Cycle Engineering Guidelines," 2001, pp. 1-11.
S.H. Mansour et al.,"Depolymerization of Polyethylene terephthalate) Waste Using 1, 4-Butanediol and Triethylene Glycol," Journal of Elastomers and Plastics; Apr. 2003, pp. 133-147, vol. 35, Sage Publications.
International Preliminary Report on Patentability; International Application No. PCT/US2011/042150; International Filing Date Jun. 28, 2011; Date of Mailing Jan. 17, 2013; 7 pages.

(Continued)

*Primary Examiner* — Tae H Yoon
(74) *Attorney, Agent, or Firm* — Cantor Colburn LLP

(57) ABSTRACT

A thermoplastic polyester composition comprising, based on the total weight of the composition, a chlorine- and bromine-free combination of: from 40 to 60 wt % of a polyester; from 25 to 35 wt % of a reinforcing filler; from 2 to 8 wt % of a flame retardant synergist selected from the group consisting of melamine polyphosphate, melamine cyanurate, melamine pyrophosphate, melamine phosphate, and combinations thereof; from 5 to 15 wt % of a phosphinate salt flame retardant; from more than 0 to less than 5 wt % of an impact modifier component comprising a poly(ether-ester) elastomer and a (meth)acrylate impact modifier; from more than 0 to 5 wt % poly(tetrafluoroethylene) encapsulated by a styrene-acrylonitrile copolymer; from more than 0 to 2 wt % of a stabilizer; wherein the thermoplastic polyester composition contains less than 5 wt % of a polyetherimide.

13 Claims, No Drawings

(56) References Cited

U.S. PATENT DOCUMENTS

| | | |
|---|---|---|
| 7,105,589 B2 | 9/2006 | Geprags |
| 7,169,836 B2 | 1/2007 | Harashina et al. |
| 7,498,368 B2 | 3/2009 | Harashina et al. |
| 2001/0007888 A1 | 7/2001 | Asano et al. |
| 2001/0009944 A1 | 7/2001 | Chisholm et al. |
| 2002/0096669 A1 | 7/2002 | Van Der Spek et al. |
| 2002/0123566 A1 | 9/2002 | Georgiev et al. |
| 2003/0013788 A1 | 1/2003 | Mason et al. |
| 2003/0018107 A1 | 1/2003 | Heinen et al. |
| 2004/0192812 A1 | 9/2004 | Engelmann et al. |
| 2005/0038145 A1 | 2/2005 | Gallucci et al. |
| 2005/0137297 A1 | 6/2005 | De Wit |
| 2005/0137300 A1 | 6/2005 | Schlosser et al. |
| 2005/0143503 A1 | 6/2005 | Bauer et al. |
| 2005/0154099 A1 | 7/2005 | Kobayashi et al. |
| 2005/0272839 A1 | 12/2005 | Bauer et al. |
| 2006/0058431 A1 | 3/2006 | Cartier et al. |
| 2006/0084734 A1 | 4/2006 | Bauer et al. |
| 2006/0111519 A1 | 5/2006 | Strand et al. |
| 2006/0142455 A1 | 6/2006 | Agarwal et al. |
| 2006/0236986 A1 | 10/2006 | Fujisawa et al. |
| 2006/0247339 A1 | 11/2006 | Harashina et al. |
| 2006/0287422 A1 | 12/2006 | Volkers et al. |
| 2007/0049667 A1 | 3/2007 | Kim et al. |
| 2007/0161725 A1 | 7/2007 | Janssen |
| 2007/0275242 A1 | 11/2007 | Gopal et al. |
| 2008/0090950 A1 | 4/2008 | Costanzi et al. |
| 2008/0139711 A1 | 6/2008 | Borade et al. |
| 2008/0242789 A1 | 10/2008 | Zhu et al. |
| 2008/0269383 A1 | 10/2008 | Pauquet et al. |
| 2009/0124733 A1 | 5/2009 | Haruhara et al. |
| 2009/0203871 A1 | 8/2009 | Maruyama et al. |

FOREIGN PATENT DOCUMENTS

| | | |
|---|---|---|
| EP | 0400935 A2 | 12/1990 |
| EP | 0672717 A1 | 9/1995 |
| EP | 1967549 A1 | 9/2008 |
| JP | 04345655 A | 12/1992 |
| JP | 2000007902 | 2/2000 |
| WO | 9965987 A1 | 12/1999 |
| WO | 0121698 A1 | 3/2001 |
| WO | 0181470 A1 | 11/2001 |
| WO | 2005059018 A1 | 6/2005 |
| WO | 2007084538 A2 | 7/2007 |
| WO | 2007111774 A2 | 10/2007 |
| WO | 2008011940 A1 | 1/2008 |
| WO | 2008014254 A2 | 1/2008 |
| WO | 2008014273 A1 | 1/2008 |

OTHER PUBLICATIONS

International Search report and Written Opinion; International Application No. PCT/US2011/042143; International Filing Date Jun. 28, 2011; Date of Mailing Sep. 21, 2011; 11 pages.

FLAME RESISTANT POLYESTER COMPOSITIONS, METHOD OF MANUFACTURE, AND ARTICLES THEREOF

BACKGROUND

This disclosure relates to polyester compositions, method of manufacture of the compositions, and articles thereof.

Thermoplastic polyester compositions, such as poly(alkylene terephthalates), have valuable characteristics including strength, toughness, high gloss, and solvent resistance. Polyesters therefore have utility as materials for a wide range of applications, from automotive parts to electric and electronic appliances. Because of their wide use, particularly in electronic applications, it is desirable to provide flame retardancy to polyesters.

Numerous flame retardants (FR) for polyesters are known, but many contain halogens, usually chlorine and/or bromine. Halogenated flame retardant agents are less desirable because of the increasing demand for ecologically friendly ingredients. Halogen-free flame-retardants, such as phosphorus- and nitrogen-based compounds can be used as well. Unfortunately, it can be difficult to achieve excellent flame retardancy in very thin sections.

More ecologically compatible flame retardant (eco-FR) formulations based on aluminum salts of phosphinic or diphosphinic acid compounds and melamine compounds have been developed to overcome environmental issues of halogenated flame retardants. However, these eco-FR compositions can have reduced impact strength and tensile strength, as well as less desirable flow properties compared to compositions having halogenated flame retardants. The addition of small amounts of a polyetherimide (PEI), in particular ULTEM 1010 from Sabic Innovative Plastics, has boosted the mechanical properties of the eco-FR compositions. However, in some circumstances PEI lowers the comparative tracking index (CTI) compared to halogenated frame retardants, i.e., the presence of PEI can increase the tendency to form conductive leakage paths on the surface of a molded article.

Thus, there remains a need for eco-FR thermoplastic polyester compositions having good flame retardant properties and comparable or improved mechanical properties, including ductility, flexural strength, CTI, and stiffness relative to compositions comprising halogenated flame retardants and eco-FR compositions comprising PEI.

BRIEF SUMMARY OF THE INVENTION

Disclosed herein is a thermoplastic polyester composition comprising, based on the total weight of the composition, a chlorine- and bromine-free combination of: (a) from 40 to 60 wt % of a polyester; (b) from 25 to 35 wt % of a reinforcing filler, (c) from 2 to 8 wt % of a flame retardant synergist selected from the group consisting of melamine polyphosphate, melamine cyanurate, melamine pyrophosphate, melamine phosphate, and combinations thereof; (d) from 5 to 15 wt % of a phosphorous flame retardant comprising: a phosphinate of formula (I)

a diphosphinate of formula (II)

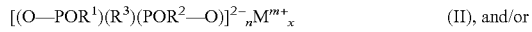

a polymer derived from the phosphinate of formula (I) or the diphosphinate of the formula (II), wherein $R^1$ and $R^2$ are each independently the same or different, and are H, linear or branched $C_1$-$C_6$ alkyl, or $C_6$-$C_{10}$ aryl; $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or B; m is 1, 2, 3 or 4; n is 1, 2, or 3; and x is 1 or 2; (e) from more than 0 to less than 5 wt % of an impact modifier component comprising a poly(ether-ester) elastomer and a (meth)acrylate impact modifier, (f) from more than 0 to 5 wt % poly(tetrafluoroethylene) encapsulated by a styrene-acrylonitrile copolymer; (g) from more than 0 to 2 wt % of a stabilizer, wherein the thermoplastic polyester composition contains less than 5 wt % of a polyetherimide.

Also disclosed is a thermoplastic polyester composition comprising, based on the weight of the composition, a chlorine- and bromine-free combination of: (a) from 40 to 60 wt % of polybutylene terephthalate, (b) from 25 to 35 wt % of a glass fiber filler, (c) from 2 to 8 wt % of a flame retardant synergist selected from the group consisting of melamine polyphosphate, melamine cyanurate, melamine pyrophosphate, melamine phosphate, and combinations thereof; (d) from more than 10 to 15 wt % a phosphinate of formula (I)

a diphosphinate of formula (II)

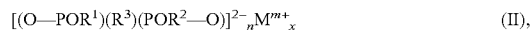

and/or a polymer derived from the phosphinate of formula (I) or the diphosphinate of the formula (II), wherein $R^1$ and $R^2$ are identical or different and are H, linear or branched $C_1$-$C_6$ alkyl, or $C_6$-$C_{10}$ aryl; $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or B; m is 1, 2, 3 or 4; n is 1, 2, or 3; and x is 1 or 2; (e) at least 1% to less than 5 weight % of impact modifier component comprising a combination of (i) a poly(ether-ester) elastomer and (ii) a core-shell (meth)acrylate impact modifier; wherein the poly(ether-ester) elastomer comprises long-chain ester units of formula (III):

$$-GOCOR'COO- \qquad (III);$$

and short-chain ester units having units of formula (IV):

$$-DOCOR'COO- \qquad (IV),$$

wherein R' is a divalent aromatic radical remaining after removal of carboxyl groups from terephthalic acid, isophthalic acid, or a combination of terephthalic acid and isophthalic acid; G is a divalent polyalkylene oxide radical remaining after removal of terminal hydroxyl groups from a poly (alkylene oxide) glycol having a number-average molecular weight of 100 to 2500; and D is a divalent alkylene radical remaining after removal of hydroxyl groups from aliphatic diols having a molecular weight from 62 to 286; and wherein the core-shell meth(acrylate) impact modifier has a crosslinked poly(butyl acrylate) core with a grafted poly(methyl methacrylate) shell; (f) from more than 0 to 5 wt % poly(tetrafluoroethylene) encapsulated by a styrene-acrylonitrile copolymer; and (g) from more than 0 wt % to 2 wt % of a stabilizer; wherein the halogen free composition contains less than 5 wt % of a polyetherimide; and wherein an article molded from the composition exhibits (a) a flexural modulus that is more than 9800 MPa, (b) a flexural stress that is more than 150 MPa, (c) an unnotched impact strength that is more than 470 Joules/meter, and (d) a V0 rating at 0.8 mm, measured in accordance with UL 94.

Still further disclosed is a thermoplastic polyester composition comprising, based on the weight of the composition, a halogen-free combination of: (a) from 40 to 60 wt % of polybutylene terephthalate; (b) from 25 to 35 wt % glass fiber filler, (c) from 2 to 8 wt % of a flame retardant synergist selected from the group consisting of melamine polyphosphate, melamine cyanurate, melamine pyrophosphate, melamine phosphate, and combinations thereof; (d) from more than 10 to 15 wt % a phosphinate of formula (I)

a diphosphinate of formula (II)

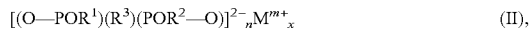

and/or a polymer derived from the phosphinate of formula (I) or the diphosphinate of the formula (II), wherein $R^1$ and $R^2$ are identical or different and are H, or linear or branched $C_1$-$C_6$ alkyl; $R^3$ is $C_1$-$C_{10}$, linear or branched alkylene; M is aluminum; m is 3; n is 3; and x is 1 or 2; (e) at least 1 to less than 5 wt % of impact modifier component comprising a combination of (i) a poly(butylene terephthalate-polytetrahydrofuran) block copolymer and (ii) a core-shell (meth)acrylate impact modifier having a crosslinked poly(butyl acrylate) core with a grafted poly(methyl methacrylate) shell; (f) from more than 0 to 5 wt % poly(tetrafluoroethylene) encapsulated by a styrene-acrylonitrile copolymer; and (g) from more than 0 wt % to 2 wt % of a stabilizer; wherein the halogen free composition contains less than 2 wt % of a polyetherimide; and wherein an article molded from the composition exhibits (a) a flexural modulus that is more than 9800 MPa, (b) a flexural stress that is more than 150 MPa, (c) an unnotched impact strength that is more than 470 Joules/meter, and (d) a V0 rating at 0.8 mm, measured in accordance with UL 94.

Also disclosed are methods for the manufacture of the foregoing compositions; and articles comprising the foregoing compositions.

DETAILED DESCRIPTION OF THE INVENTION

Our invention is based on the discovery that that it is possible to make a glass filled halogen free flame retarding composition that exhibits many useful properties: namely, good flame retardancy performance (i.e. V0 at 0.80 mm), higher CTI performance, improved impact properties and improved flexural properties by the use of a specific combination of elastomers, as compared to a composition that does not use the combination of elastomers. Described herein is a flame retardant thermoplastic polyester composition that is chlorine- and bromine-free, and that includes a polyester, a reinforcing filler, a melamine-based flame retardant synergist, a phosphinate salt flame retardant, an anti-drip agent, an impact modifier component comprising a poly(ether-ester) elastomer and an acrylate impact modifier, a stabilizer, and only optionally a polyetherimide. Use of the specific components in the amounts disclosed herein allows manufacture of a chlorine- and bromine-free composition with excellent flame retardance and improved flow and CTI, while maintaining and the desirable mechanical properties of currently used glass-filled eco-FR formulations, even in the absence of a polyetherimide. In particular, the compositions can have very useful impact strength properties, flexural properties, heat stability, flow properties, and/or high resistance against electrical breakdown.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated. All cited references are incorporated herein by reference.

For the sake of clarity, the terms "terephthalic acid group," "isophthalic acid group," "butanediol group," and "ethylene glycol group" have the following meanings. The term "terephthalic acid group" in a composition refers to a divalent 1,4-benzene radical (-1,4-($C_6H_4$)—) remaining after removal of the carboxylic groups from terephthalic acid-. The term "isophthalic acid group" refers to a divalent 1,3-benzene radical (-(-1,3-$C_6H_4$)—) remaining after removal of the carboxylic groups from isophthalic acid. The "butanediol group" refers to a divalent butylene radical (—($C_4H_8$)—) remaining after removal of hydroxyl groups from butanediol. The term "ethylene glycol group" refers to a divalent ethylene radical (—($C_2H_4$)—) remaining after removal of hydroxyl groups from ethylene glycol. With respect to the terms "terephthalic acid group," "isophthalic acid group," "ethylene glycol group," "butane diol group," and "diethylene glycol group" being used in other contexts, e.g., to indicate the weight % of the group in a composition, the term "isophthalic acid group(s)" means the group having the formula (—O(CO)$C_6H_4$(CO)—), the term "terephthalic acid group" means the group having the formula (—O(CO)$C_6H_4$(CO)—), the term diethylene glycol group means the group having the formula (—O($C_2H_4$)O($C_2H_4$)—), the term "butanediol group" means the group having the formula (—O($C_4H_8$)—), and the term "ethylene glycol groups" means the group having formula (—O($C_2H_4$)—).

Polyesters for use in the present thermoplastic compositions having repeating structural units of formula (I)

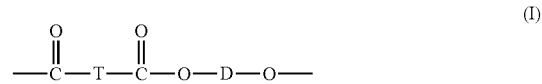

wherein each T is independently the same or different divalent $C_{6-10}$ aromatic group derived from a dicarboxylic acid or a chemical equivalent thereof, and each D is independently a divalent $C_{2-4}$ alkylene group derived from a dihydroxy compound or a chemical equivalent thereof. Copolyesters containing a combination of different T and/or D groups can be used. Chemical equivalents of diacids include the corresponding esters, alkyl esters, e.g., $C_{1-3}$ dialkyl esters, diaryl esters, anhydrides, salts, acid chlorides, acid bromides, and the like. Chemical equivalents of dihydroxy compounds include the corresponding esters, such as $C_{1-3}$ dialkyl esters, diaryl esters, and the like. The polyesters can be branched or linear. Exemplary polyesters include poly(alkylene terephthalate) ("PAT"), poly(1,4-butylene terephthalate), ("PBT"), poly(ethylene terephthalate) ("PET"), poly(ethylene naphthalate) ("PEN"), poly(butylene naphthalate), ("PBN"), poly(propylene terephthalate) ("PPT"), poly(cyclohexane dimethanol terephthalate) ("PCT"), poly(cyclohexane-1,4-dimethylene cyclohexane-1,4-dicarboxylate) also known as poly(1,4-cyclohexanedimethanol 1,4-dicarboxylate) ("PCCD"), poly(cyclohexanedimethanol terephthalate), poly(cyclohexylenedimethylene-co-ethylene terephthalate), cyclohexanedimethanol-terephthalic acid-isophthalic acid copolymers and cyclohexanedimethanol-terephthalic acid-ethylene glycol ("PCTG" or "PETG") copolymers. When the molar proportion of cyclohexanedimethanol is higher than that of ethylene glycol the polyester is termed PCTG. When the molar proportion of ethylene glycol is higher than that of cyclohexane dimethanol the polyester is termed PETG.

The polyesters can be obtained by methods well known to those skilled in the art, including, for example, interfacial polymerization, melt-process condensation, solution phase condensation, and transesterification polymerization. Such polyester resins are typically obtained through the condensation or ester interchange polymerization of the diol or diol equivalent component with the diacid or diacid chemical equivalent component. Methods for making polyesters and the use of polyesters in thermoplastic molding compositions are known in the art. Conventional polycondensation procedures are described in the following, see, generally, U.S. Pat. Nos. 2,465,319, 5,367,011 and 5,411,999. The condensation reaction can be facilitated by the use of a catalyst, with the choice of catalyst being determined by the nature of the reactants. The various catalysts are known in the art. For example, a dialkyl ester such as dimethyl terephthalate can be transesterified with butylene glycol using acid catalysis, to generate poly(butylene terephthalate). It is possible to use a branched polyester in which a branching agent, for example, a glycol having three or more hydroxyl groups or a trifunctional or multifunctional carboxylic acid has been incorporated.

Commercial examples of PBT include those available under the trade names VALOX 315 and VALOX 195, manufactured by SABIC Innovative Plastics.

A combination of polyesters can be used, for example a combination of virgin polyesters (polyesters derived from monomers rather than recycled polymer, including virgin poly(1,4-butylene terephthalate). Also contemplated herein are second polyesters comprising minor amounts, e.g., 0.5 to 30 wt %, of units derived from aliphatic acids and/or aliphatic polyols to form copolyesters. The aliphatic polyols include glycols, such as poly(ethylene glycol). Such polyesters can be made following the teachings of, for example, U.S. Pat. No. 2,465,319 to Whinfield et al., and U.S. Pat. No. 3,047,539 to Pengilly. Second polyesters comprising block copolyester resin components are also contemplated, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of, e.g., up to 5 mole percent based on the acid units of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; and hydroxydicarboxylic acids and derivatives, such as dimethyl hydroxyterephthalate, and the like. Branched poly(alkylene terephthalate) resins and their preparation are described, for example, in U.S. Pat. No. 3,953,404 to Borman. In addition to terephthalic acid units, small amounts, e.g., from 0.5 to 15 mole percent of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexane dimethanol, etc., as well as minor amounts of trifunctional, or higher, branching components, e.g., pentaerythritol, trimethyl trimesate, and the like.

In an embodiment, a PBT is used in combination with a poly(ethylene terephthalate), poly(1,4-butylene terephthalate), poly(ethylene naphthalate), poly(1,4-butylene naphthalate), poly(trimethylene terephthalate), poly(1,4-cyclohexanenedimethylene 1,4-cyclohexanedicarboxylate), poly(1,4-cyclohexanedimethylene terephthalate), poly(1,4-butylene-co-1,4-but-2-ene diol terephthalate), poly(cyclohexanedimethylene-co-ethylene terephthalate), or a combination thereof. The weight ratio of PBT:other polyester can vary from 50:50 to 99:1, specifically from 80:20 to 99:1.

Any of the foregoing first and optional second polyesters can have an intrinsic viscosity of 0.4 to 2.0 deciliters per gram (dL/g), measured in a 60:40 by weight phenol/1,1,2,2-tetrachloroethane mixture at 23° C. The PBT can have a weight average molecular weight of 10,000 to 200,000 Daltons, specifically 50,000 to 150,000 Daltons as measured by gel permeation chromatography (GPC). The polyester component can also comprise a mixture of different batches of PBT prepared under different process conditions in order to achieve different intrinsic viscosities and/or weight average molecular weights. In an embodiment, a combination of polyesters having different viscosities is used, for example a combination comprising a first polyester having a viscosity from 0.5 to 1.0 dL/g and a second polyester having an intrinsic viscosity ranging from 1.1 to 1.4 dL/g. One or both of the polyesters can be a PBT. The weight ratio of the two polyesters of different viscosity can be adjusted to achieve the desired properties, and is generally within the range of 20:80 to 80:20, more specifically from 40:60 to 60:40.

The amount of the polyester in the compositions can be adjusted to provide the desired properties within the limits described herein, which varies with the specific application. The composition can accordingly comprise from 40 to 60 wt %, specifically from 45 to 55 wt %, of the polyester, wherein each of the foregoing is based on the total weight of the composition.

The composition includes a melamine flame retardant synergist and a phosphinate flame retardant. It has been found that this combination provides excellent flame retardance, in combination with advantageous physical properties in the absence of PEI. The flame retardant synergist is melamine pyrophosphate, melamine polyphosphate, melamine phosphate, or melamine cyanurate. Combinations comprising the foregoing can be used.

The flame retardant synergist is present in the composition in an amount from 2 to 8 wt %, specifically from 3 to 7 wt %, still more specifically from 4 to 6 wt %, each based on the total weight of the composition.

The flame retardant synergist is used in combination with one or more phosphinic acid salts. The phosphinates and diphosphinates include those set forth in U.S. Pat. No. 6,255,371 to Schosser et al. The specification of this patent, column 1, line 46 to column 3 line 4 is incorporated by reference into the present specification. Specific phosphinates mentioned include aluminum diethylphosphinate (DEPAL), and zinc diethylphosphinate (DEPZN). The phosphinates have the formulas (I) and (II):

and

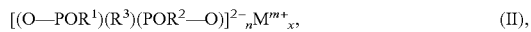

and include polymers comprising such formula I or II, wherein $R^1$ and $R^2$ are the same or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or boron; m is 1, 2, 3 or 4; n is 1, 2, or 3; and x is 1 or 2. In an embodiment $R^1$ and $R^2$ are the same and are $C_1$-$C_6$-alkyl, linear or branched, or phenyl; $R^3$ is $C_1$-$C_{10}$-alkylene, linear or branched, $C_6$-$C_{10}$-arylene, -alkylarylene or -arylalkylene; M is magnesium, calcium, aluminum, zinc, or a combination thereof; m is 1, 2 or 3; n is 1, 2 or 3; and x is 1 or 2. $R^1$ and $R^2$ can be H, in addition to the substituents referred to set forth in the patent. This results in a hypophosphite, a subset of phosphinate, such as calcium hypophosphite, aluminum hypophosphite, and the like.

In a specific embodiment M is aluminum, and $R^1$ and $R^2$ are the same and are H, $C_1$-$C_6$ alkyl, linear or branched; and $R^3$ is $C_1$-$C_{10}$ alkylene, linear or branched. A commercial example of a phosphinic acid salt includes aluminum diethyl phosphinic acid (Al-DPA), commercially available from Clariant Corp.

The composition comprises from 5 to 15 wt %, specifically from 8 to 14 wt %, even more specifically from 10 to 12.5 wt % of a flame retardant phosphinate salt, based on the total weight of the composition.

The thermoplastic polyester composition also comprises a reinforcing filler, for example rigid fibers such as glass fibers, carbon fibers, metal fibers, ceramic fibers or whiskers, and the like. Glass fibers typically have a modulus of greater than or equal to about 6,800 megaPascals, and can be chopped or continuous. The glass fiber can have various cross-sections, for example, round, trapezoidal, rectangular, square, crescent, bilobal, trilobal, and hexagonal. Glass fibers can be in the form of chopped strands having an average length of from 0.1 mm to 10 mm, and having an average aspect ratio of 2 to 5. In articles molded from the compositions, shorter lengths will typically be encountered because during compounding considerable fragmentation can occur.

In some applications it can be desirable to treat the surface of the fiber, in particular a glass fiber, with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The reinforcing filler, for example a glass fiber, is present in the composition in an amount from 25 to 35 wt %, specifically from 20 to 40% by weight, and most preferably, from 25 to 35% by weight.

In still other embodiments, the compositions can optionally additionally comprise a particulate (non-fibrous) organic filler, which can impart additional beneficial properties to the compositions such as thermal stability, increased density, stiffness, and/or texture. Exemplary particulate fillers are inorganic fillers such as alumina, amorphous silica, alumino silicates, mica, clay, talc, glass flake, glass microspheres, metal oxides such as titanium dioxide, zinc sulfide, ground quartz, and the like.

In some embodiments, the reinforcing filler, for example glass fibers, is used in combination with a flat, plate-like filler, for example talc, mica or flaked glass. Typically, the flat, plate-like filler has a length and width at least ten times greater than its thickness, where the thickness is from 1 to about 1000 microns. Combinations of rigid fibrous fillers with flat, plate-like fillers can reduce warp of the molded article. A specific particulate filler is talc, in particular a talc filler having an average largest dimension of less than 0.9 micrometers. In addition, or in the alternative, the filler can have a median particle size of less than 0.9 micrometers. In an embodiment, the equivalent spherical diameter of the particle is used to determine particle size. Use of these types of filler provides molded articles having both low shrinkage and a smooth surface finish. Use of these types of filler can also aid the crystallization of the polyester, and increase heat resistance of the composition. Such talcs are commercially available from Barretts Minerals Inc. under the trade name ULTRATALC® 609.

When present, the particulate filler is used in an amount from more than zero to 3 wt %, specifically more than 0 to 2 wt %, more specifically from 0.1 to 1 wt %.

The composition further comprises a specific amount of a specific combination of two types impact modifiers, a poly (ether-ester) elastomer and a (meth)acrylate impact modifier. It has surprising been found that use of only a single impact modifier, or a combination of impact modifiers outside of the specified range, adversely affects the desired combination of properties. In a specific embodiment, no other impact modifiers are present in the composition.

Poly(ester-ether) elastomers are copolymers that contain "hard blocks" (derived from the polyester units) and "soft blocks" (derived from the polyether units) that provide the polymer with elastomeric properties. The copolymers can be characterized by the melting temperature (Tm) of the hard block and the glass transition temperature (Tg) of the soft block. In general, the Tm of the hard block can be 120 to 200° C., specifically 150 to 195° C., and the Tg of the soft block can be −25 to −85° C., specifically −45 to −65° C.

The poly(ester-ether) elastomers accordingly comprise units derived from the reaction of a dicarboxylic acid component (or chemical equivalent thereof) with two types of diols (or chemical equivalent thereof), a short chain $C_{1-10}$ diol, and a long-chain poly(oxyalkylene)diol.

The dicarboxylic acid component can be one or more of the dicarboxylic acids described above in connection with the polyesters. In one embodiment, the dicarboxylic acid is aromatic, for example terephthalic acid, isophthalic acid, or a combination comprising at least one of the foregoing acids. In a specific embodiment, the dicarboxylic acid is terephthalic acid. In another embodiment, the dicarboxylic acid is a combination of terephthalic acid and isophthalic acid.

Suitable short chain diols include $C_{1-8}$ diols as described above in connection with the polyester. Specific diols are ethylene glycol and butane diol, even more specifically butane diol.

The poly(oxyalkylene)diol is derived from the polymerization of a $C_{1-6}$ diol or a combination comprising one or more $C_{1-6}$ diols, in particular $C_{2-4}$ diols, or the chemical equivalents thereof. Poly(oxytetramethylene)glycol is preferred, and can be prepared by well known techniques. The poly(oxyalkylene)diol, in particular the poly(oxytetramethylene)glycol, has a weight average molecular weight (Mw) of 100 to 5,000, or more specifically, 150 to 4,000, or even more specifically, 200 to 3,000.

The poly(ether-ester) elastomers can accordingly comprise long-chain ester units of formula (III):

  (III);

and short-chain ester units having units of formula (IV):

  (IV), wherein R' is a divalent aromatic radical remaining after removal of carboxyl groups from terephthalic acid, isophthalic acid, or a combination of terephthalic acid and isophthalic acid; G is s divalent polyalkylene oxide radical remaining after removal of terminal hydroxyl groups from a poly(alkylene oxide) glycol having a number-average molecular weight of 100 to 2500 Daltons; and D is the divalent alkylene radical remaining after removal of hydroxyl groups from an aliphatic diol having a molecular weight from 62 to 286.

A specific poly(ester-ether) elastomers is a poly(butylene terephthalate/isophthalate-oxytetramethylene) copolymer, i.e., a poly(butylene terephthalate-polytetrahydrofuran) block copolymer. The copolymer comprises 25 to 65 wt %, more specifically 30 to 60 wt %, even more specifically 25 to 55 wt % of units derived from poly(oxytetramethylene)glycol or chemical equivalents thereof, based on the weight of the copolymer.

The poly(butylene terephthalate-oxytetramethylene) copolymer can further comprise isophthalic acid in addition to terephthalic acid. In one embodiment, the poly(butylene terephthalate/isophthalate-oxytetramethylene) copolymer comprises 0 to 40 mole % of units derived from isophthalic acid or a chemical equivalent thereof, based on the total number of isophthalate and terephthalate units. For example, the poly(butylene terephthalate/isophthalate-oxytetramethylene) copolymer can comprise less than 5 mole % of isophthalate units, specifically 0 to 5 mole % of isophthalate units, based on the total number of isophthalate and terephthalate units in the copolymer. In another embodiment, the poly(butylene terephthalate/isophthalate-oxytetramethylene) copolymer comprises greater than 5 mole % of isophthalate units, specifically 5 to 40 mole %, based on the total number of isophthalate and terephthalate units in the copolymer.

A variety of poly(ether-ester) copolymers are commercially available, for example under the trademarks ARNITEL EM400 and ARNITEL EL630 poly(ether-ester) copolymers from DSM; HYTREL 3078, HYTREL 4056, HYTREL 4556, and HYTREL 6356 poly(ether-ester) copolymers from DuPont; and ECDEL 9966 poly(ether-ester) copolymer from Eastman Chemical. In all cases, the soft block is derived from tetrahydrofuran. In the HYTREL 4556, HYTREL 6356, ARNITEL EM400, and ARNITEL EL630 poly(ether-ester) copolymers, the hard block is based on poly(butylene terephthalate) (PBT). In the HYTREL 4056 poly(ether-ester) copolymer, the hard block contains isophthalate units in addition to terephthalate units. In the ECDEL 9966 poly(ether-ester) copolymer, the hard block is based on poly(1,4-cyclohexane-dimethanol-1,4-cyclohexane dicarboxylate) (PCCD) units. In another embodiment, the poly(ether-ester) elastomer can include a thermoplastic copolyetherester elastomer derived from polyethylene terephthalate, in particular, post-consumer polyethylene terephthalate. The random copolyetherester contains a modified, random polybutylene terephthalate copolymer block that is derived from a polyethylene terephthalate component selected from the group consisting of polyethylene terephthalate and polyethylene terephthalate copolymers, or a combination thereof; and contains at least one residue derived from the polyethylene terephthalate component; and a polyalkylene oxide copolymer block that is derived from a polyethylene terephthalate component and polyalkylene oxide glycol, and contains polyalkylene oxide and at least one residue derived from the polyethylene terephthalate component. Such random copolyetheresters are disclosed in U.S. Publ. 2008/0027167, and is commercially available under the trademark VALOX iQ elastomer, which can be available from SABIC Innovative Plastics.

The impact modifier component also comprises a (meth)acrylate impact modifier. A (meth)acrylate impact modifier includes graft and/or core shell structures having a rubbery component with a Tg below 0° C., preferably between about −40° to about −80° C., and which include a poly(alkyl(meth)acrylate) or polyolefin grafted with a poly(methyl methacrylate) or styrene-acrylonitrile copolymer.

Typical core materials in core-shell impact modifiers consist substantially of a (meth)acrylate rubber, for example a (meth)acrylate rubber of derived from a C4-12 acrylate. Typically, one or more shells are grafted on the core. Usually these shells are built up from a vinyl aromatic compound, a vinyl cyanide, an alkyl(meth)acrylate, (meth)acrylic acid, or a combination thereof. The shell can be derived from an alkyl (meth)acrylate, more specifically a methyl(meth)acrylate. The core and/or the shell(s) often comprise multi-functional compounds that can act as a cross-linking agent and/or as a grafting agent. In one embodiment, the (meth)acrylate impact modifier has a crosslinked poly(butyl acrylate) core with a grafted poly(methyl methacrylate) shell.

Core-shell acrylic rubbers can be of various particle sizes, for example from 300-800 nm, although larger particles, or mixtures of small and large particles, can also be used. In some instances, (meth)acrylate impact modifier with a particle size of 350-450 nm is used. In other applications where higher impact is desired, particle sizes of 450-550 nm or 650-750 nm can be used.

Specific (meth)acrylate impact modifiers include the core-shell polymers available from Rohm & Haas (now Dow Advanced Materials) under the trade name PARALOID®, including, for example, PARALOID® EXL3691 and PARALOID® EXL3330, EXL3300 and EXL2300.

Other (meth)acrylate impact modifiers include ethylene-acrylic acid copolymers (EEA), sold by Dupont under the trade name ELVALOY; ethylene-methacrylate-glycidyl methacrylate copolymers (E-GMA-MA), sold by Arkema under the trade name LOTADER®; and polyethylene-g-glycidyl methacrylate (10%), sold by Sumitomo Chemical Co. under the trade name IGETABOND E.

The impact modifier component is present in the composition in an amount from more than 0 to less than 5 wt %, specifically from 2 to 2.5 wt %.

In a specific embodiment, the impact modifier component comprises from more than 0 to 5 wt %, specifically from 2 to 4 wt %, of a combination of (i) a poly(butylene terephthalate-polytetrahydrofuran) block copolymer and (ii) a core-shell impact modifier having a crosslinked poly(butyl acrylate) core with a grafted poly(methyl methacrylate) shell.

The polyester compositions further comprise from more than 0 to 5 wt %, specifically from 0.5 to 5 wt % of an encapsulated particulate fluoropolymer, in particular poly(tetrafluoroethylene) encapsulated by a styrene-acrylonitrile copolymer). Small amounts of other fluoropolymers can be used, for example those comprising units derived from fluorinated monomers such as 3,3,3-trifluoropropene, 3,3,3,4,4-pentafluoro-1-butene, hexafluoropropylene, vinyl fluoride;

vinylidene fluoride, 1,2-difluoroethylene, and the like, or a mixture comprising at least one of the foregoing monomers The fluoropolymer is encapsulated styrene-acrylonitrile (SAN). PTFE encapsulated in styrene-acrylonitrile is also known as TSAN.

Encapsulated fluoropolymers can be made by polymerizing the encapsulating polymer in the presence of the fluoropolymer, for example an aqueous dispersion of the fluoropolymer. Alternatively, the fluoropolymer can be pre-blended with a second polymer, such as for, example, an aromatic polycarbonate or SAN to form an agglomerated material. Either method can be used to produce an encapsulated fluoropolymer. The relative ratio of monovinyl aromatic monomer and monovinylic comonomer in the rigid graft phase can vary widely depending on the type of fluoropolymer, type of monovinylaromatic monomer(s), type of comonomer(s), and the desired properties of the composition. The rigid phase can comprise 10 to 95 wt % of monovinyl aromatic monomer, specifically about 30 to about 90 wt %, more specifically 50 to 80 wt % monovinylaromatic monomer, with the balance of the rigid phase being comonomer(s). The SAN can comprise, for example, about 75 wt % styrene and about 25 wt % acrylonitrile based on the total weight of the copolymer. An exemplary TSAN comprises about 50 wt % PTFE and about 50 wt % SAN, based on the total weight of the encapsulated fluoropolymer.

The molding composition can optionally comprise a small amount of a charring polymer, in particular a polyetherimide (PEI). A commercially available polyetherimide is available from SABIC Innovative Plastics Co. under the trade name ULTEM® 1010. Other charring polymers include, poly(phenylene ether), poly(phenylenesulfide), polysulphones, polyethersulphones, poly(phenylenesulphide oxide) (PPSO), and polyphenolics (e.g., novolacs). Use of a polyetherimide in compositions comprising aluminum phosphinate salts can improve the mechanical properties of the compositions, in particular tensile strength and impact properties. High temperature molding stability can also be further improved, as well as melt stability.

The charring polymer, in particular PEI, can accordingly be present in an amount from 0 to less than 5 wt % of the composition, more specifically from more than 0 to less than 3 wt %, by even more specifically from more than 0 to less than 1 wt %, based on the total weight of the composition.

However, in a unique advantage of the current compositions, improvement in flexural modulus, notched and unnotched Izod impact strength, tensile stress at break and/or elastic modulus, and high CTI is observed when the composition comprises no polyetherimide. Thus, in one embodiment, no polyetherimide is present. In another embodiment, no charring polymer is present. In an embodiment wherein the composition contains no polyetherimide, an article molded from the composition exhibits a CTI (Comparative Tracking Index) of 600 volts.

A stabilizer component is further present in the composition, in an amount from more than 0 to 2 wt %, specifically 0.01 to 1 wt %, even more specifically 0.05 to 0.5 wt %. As used herein, a "stabilizer" is inclusive of an antioxidant, thermal stabilizer, radiation stabilizer, ultraviolet light absorbing additive, and the like, and combinations thereof. In one embodiment the stabilizer component comprises an antioxidant.

Exemplary antioxidants include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations comprising at least one of the foregoing antioxidants. A specific antioxidant is a hindered phenol stabilizer, pentaerythritol tetrakis(3,5-di-tert-butyl-4-hydroxyhydrocinnamate), sold under the trade name IRGANOX® 1010 from Ciba Specialty Chemicals.

Exemplary heat stabilizer additives include organophosphites such as triphenyl phosphite, tris-(2,6-dimethylphenyl) phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition, excluding any filler.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 parts by weight, based on 100 parts by weight of the total composition, excluding any filler.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 parts by weight, based on 100 parts by weight of the total composition, excluding any filler.

With the proviso that flame retardance properties and mechanical properties such as impact strength and flexural modulus are not significantly adversely affected, the compositions can further comprise other conventional additives used in polyester polymer compositions such as mold release agents, plasticizers, quenchers, lubricants, antistatic agents, processing aids, dyes, pigments, laser marking additives, and the like. A combination comprising one or more of the foregoing or other additives can be used. Plasticizers, lubricants, and/or mold release agents can be specifically mentioned. There is considerable overlap among these types of materials, which include phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 parts by weight, based on 100 parts by weight of the total composition, excluding any filler. An exemplary mold release agent is pentaerythritol tetrastearate, available from Faci SpA.

The compositions can be prepared by blending the components of the composition, employing a number of procedures. In an exemplary process, the polyester component, reinforcing filler, melamine flame retardant synergist, phosphinate salt flame retardant, impact modifier component, poly(tetrafluoroethylene) encapsulated by a styrene-acrylonitrile copolymer, stabilizer, and optionally polyetherimide are placed into an extrusion compounder to produce molding pellets. The components are dispersed in a matrix in the process. In another procedure, the components and reinforcing filler are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The components can be pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions, such as a Newbury or van Dorn type injection molding machine with conventional cylinder temperatures, at 230° C. to 280° C., and conventional mold temperatures at 55° C. to 95° C. The molded compositions provide an excellent balance of impact strength and flame retardancy.

In particular, the compositions provide excellent flame retardancy when molded into either thick or thin components. One set of test conditions commonly accepted and used as a standard for flame retardancy is set forth in Underwriters Laboratories, Inc. Bulletin 94, which prescribes certain conditions by which materials are rated for self-extinguishing characteristics. Another set of conditions commonly accepted and used (especially in Europe) as a standard for flame retardancy is the Glow Wire Ignition Test (GWIT), performed according to the International standard IEC 695-2-1/2. A 0.8 mm thick molded sample comprising the composition can have a UL-94 flammability rating of V0.

An article can be molded from the thermoplastic polyester composition as described above. The article can include computer fans, electrical connectors, automotive battery housings, and lighting sockets.

A molded article comprising the composition can have a flexural modulus of from 3000 MPa to 20000 MPa, more specifically more than 9800 MPa to 20000 MPa, measured in accordance with ASTM D790, and the flexural stress at break can be from 120 to 200 MPa, more specifically 130 to 190 MPa, even more specifically more than 150 MPa to 190 MPa, measured in accordance with ASTM D790.

A molded article comprising the composition can have good impact properties, for example, an unnotched Izod impact strength from to 300 to 700 J/m, more specifically, more than 470 J/m to 700 J/m, as measured at 23° C. in accordance with ASTM D256.

In a specific embodiment, the glass-filled, chlorine- and bromine-free poly(alkylene ester) flame retardant composition containing a combination of impact modifiers can have a combination of highly useful physical properties, namely, good flame retardance performance (e.g., a rating of V0 at 0.80 mm), higher CTI performance, improved impact properties and improved flexural properties, as compared to a glass-filled, chlorine and bromine-free poly(alkylene ester) flame retardant composition that contains polyimide but no elastomers. More specifically, the compositions containing a combination of elastomers can meet targeted performance properties, namely: (a) a flexural modulus greater than 9800 MPa, (b) a flexural stress greater than 150 MPa, (c) an unnotched impact strength greater than 470 Joules/meter, and (d) a rating of V0 at a thickness of 0.8 mm, measured in accordance with the UL 94 protocol.

For example, an article molded from the following thermoplastic polyester composition exhibits (a) a flexural modulus that is more than 9800 MPa, (b) a flexural stress is more than 150 MPa, (c) an unnotched impact strength that is more than 470 Joules/meter, and (d) a V0 rating at 0.8 mm, measured in accordance with UL 94, when the composition comprises, based on the weight of the composition, a combination of: (a) from 40 to 60 wt % of polybutylene terephthalate; (b) from 25 to 35 wt % glass fiber filler; (c) from 2 to 8 wt % of a flame retardant synergist selected from the group consisting of melamine polyphosphate, melamine cyanurate, melamine pyrophosphate, melamine phosphate, and combinations thereof; (d) from more than 10 to 15 wt % a phosphinate of formula (I) described herein a diphosphinate of formula (II) described herein, and/or a polymer derived from the phosphinate of formula (I) or the diphosphinate of the formula (II), (e) at least 1 to less than 5 wt % of impact modifier component comprising a combination of (i) a poly(butylene terephthalate-polytetrahydrofuran) block copolymer and (ii) a core-shell (meth)acrylate impact modifier having a crosslinked poly(butyl acrylate) core with a grafted poly(methyl methacrylate) shell; (f) from more than 0 to 5 wt % poly(tetrafluoroethylene) encapsulated by a styrene-acrylonitrile copolymer; and (g) from more than 0 wt % to 2 wt % of a stabilizer; wherein the halogen free composition contains less than 2 wt % of a polyetherimide.

Advantageously, it is now possible to make glass filled halogen free flame retarding compositions that exhibit good flame retardancy performance (i.e., V0 at 0.80 mm), higher CTI performance, improved impact properties and improved flexural properties. Our invention provides an eco-FR thermoplastic polyester composition having good flame retardant properties and comparable or improved mechanical properties, including ductility, flexural strength, CTI, and stiffness relative to compositions comprising halogenated flame retardants and eco-FR compositions comprising PEI.

It should be clear that the compositions and articles disclosed herein can include reaction products of the above described components used in forming the compositions and articles.

The invention is further illustrated by the following non-limiting examples, in which all parts are by weight unless otherwise stated.

EXAMPLES

The following materials are used in Examples 1 to 7 (i.e., E1 to E7) and Comparative Examples 1 to 25 (i.e., CE1 to CE25). Table 1 shows the nomenclature used as well as a description.

TABLE 1

Abbreviation, Description and Sources of Materials used in Examples

| Abbreviation | Description | Source |
|---|---|---|
| VALOX 315 | Intrinsic viscosity = 1.19 dl/g, Mn = 110,000 g/mol | SABIC Innovative Plastics Company |
| VALOX 195 | Intrinsic viscosity = 0.66 dl/g, Mn = 53400 g/mol | SABIC Innovative Plastics Company |
| Glass Fiber | 13-micron diameter | PPG Industries |
| MPP | Melamine polyphosphate | Ciba Specialty |
| Al-DPA | Aluminum diethyl phosphinic acid | Clariant |
| PEI | Polyetherimide (ULTEM 1010) | SABIC Innovative Plastics Company |
| TSAN | SAN encapsulated PTFE | SABIC Innovative Plastics Company |
| AO | Hindered phenol stabilizer | Ciba Specialty |
| PETS | Pentaerythritol tetrastearate | Faci SpA |
| ULTRATALC | Talc (avg particle size <0.90 micrometer) | Barretts |
| ELVALOY 2615 AC | Ethylene-ethyl acrylate copolymer | Dupont |
| IGETABOND E | Polyethylene-g-glycidyl methacrylate (10%) | Sumitomo |
| LOTADER | E-GMA-MA | Arkema |
| HYTREL | Poly(butylene tere/iso phthalate-co-polyoxybutylene) | Dupont |
| PARALOID EXL | Acrylic polymer impact modifier | Rohm & Haas |

Techniques and Procedures

Extrusion/Molding Procedures. The components as shown in Table 1 are tumble blended and then extruded on a 27-mm twin-screw extruder with a vacuum vented mixing screw, at a barrel and die head temperature of 240° C.-265° C. and a screw speed of 300 rpm. The extrudate is cooled through a water bath before pelletizing. ASTM Izod and flexural bars are injection molded on a van Dorn molding machine with a set temperature of approximately 240° C. to 265° C. The pellets are dried for 3 to 4 hours at 120° C. in a forced air-circulating oven before injection molding.

Un-notched Izod Testing/Flexural Testing/Flame Testing. Un-notched Izod testing is performed on 75 mm×12.5 mm×3.2 mm bars in accordance with ASTM D256. Flexural properties are measured in accordance with ASTM D790 on molded samples having a thickness of 3.2 mm. Flame testing per UL 94 protocol is conducted on flame bars with 0.80 mm thickness after both 23° C./48 hr and 70° C./168 hr aging conditions.

CTI Testing Procedures. CTI is used to measure the electrical breakdown (tracking) properties of the test material. In order to test for CTI, a specimen (2.54 cm diameter disk or larger) is molded from the pellets and placed on a support. Two electrodes, 4 mm apart, touch the specimen surface. A solution of 0.1% ammonium chloride electrolyte solution is introduced via a syringe. One drop falls every 30 seconds on the surface between the electrodes. The test proceeds by setting the electrodes to a fixed applied voltage between 100 volts to 600 volts, and turning the syringe pump on. The voltage that caused failure at 50 drops of electrolytes is selected as a measure of susceptibility of a material to tracking. Interpolation is used if necessary to obtain this voltage. Performance Level Categories (PLC) are used to avoid excessive implied precision and bias. The relationship between tracking index voltage and PLC is shown in Table 2.

TABLE 2

Relationship between tracking index and PLC

| Tracking Index (V) | PLC Rating |
|---|---|
| 600 and Greater | 0 |
| 400 through 599 | 1 |
| 250 through 399 | 2 |
| 175 through 249 | 3 |
| 100 through 174 | 4 |
| <100 | 5 |

Examples 1-7

Comparative Examples 1-2

The purpose of Examples 1-7 is to make a glass-filled, chlorine and bromine-free poly(alkylene) ester composition containing a combination of elastomers and evaluate their performance with regard to the following properties: (i) flame retardance performance (i.e., V0 at 0.80 mm), (ii) CTI performance, (iii) impact properties and (iv) flexural properties. These compositions are evaluated to determine whether they certain minimum targeted performance properties, namely: (a) a flexural modulus greater than 9800 MPa, (b) a flexural stress greater than 150 MPa, (c) an unnotched impact strength greater than 470 Joules/meter, and (d) a rating of V0 at a thickness of 0.8 mm, measured in accordance with the UL 94 protocol.

The purpose of Comparative Examples 1-2 is compare the performance properties of the compositions of Examples 1-7 with (i) a glass-filled, chlorine and bromine-free poly(alkylene ester) flame retardant composition that contained polyimide but no elastomers (Comparative Example 1) and (ii) a glass-filled, chlorine and bromine-free poly(alkylene ester) flame retardant composition that contained no polyimide and no elastomers (Comparative Example 2).

TABLE 3

Formulation and physical properties of 30% glass-filled, chlorine- and bromine-free, flame retardant poly(alkylene ester) compositions (Examples 1 to 7)

| Item Description | Unit | Targeted Performance | E1 | E2 | E3 | E4 | E5 | E6 | E7 |
|---|---|---|---|---|---|---|---|---|---|
| VALOX 315 | % | | 24.83 | 24.83 | 24.58 | 24.58 | 24.58 | 25.58 | 25.33 |
| VALOX 195 | % | | 24.83 | 24.83 | 24.58 | 24.58 | 24.58 | 25.58 | 25.33 |
| Glass Fiber | % | | 30.00 | 30.00 | 30.00 | 30.00 | 30.00 | 30.00 | 30.00 |
| MPP | % | | 5.00 | 5.00 | 5.00 | 5.00 | 5.00 | 5.00 | 5.00 |
| Al-DPA | % | | 12.50 | 12.50 | 12.50 | 12.50 | 12.50 | 11.00 | 11.00 |
| TSAN | % | | 0.50 | 0.50 | 0.50 | 0.50 | 0.50 | 0.50 | 0.50 |
| AO | % | | 0.15 | 0.15 | 0.15 | 0.15 | 0.15 | 0.15 | 0.15 |
| PETS | % | | 0.20 | 0.20 | 0.20 | 0.20 | 0.20 | 0.20 | 0.20 |
| ULTRATALC | % | | — | — | — | — | — | — | 0.50 |
| PEI | | | — | — | — | — | — | — | — |
| HYTREL | % | | 1.00 | 1.50 | 1.88 | 1.25 | 1.88 | 1.50 | 1.50 |
| PARALOID EXL | % | | 1.00 | 0.50 | 0.63 | 1.25 | 0.63 | 0.50 | 0.50 |
| Total | | | 100 | 100 | 100 | 100 | 100 | 100 | 100 |

| Test Description | Unit | | E1 | E2 | E4 | E5 | E6 | E7 | E8 |
|---|---|---|---|---|---|---|---|---|---|
| Flexural Modulus | MPa | >9800 | 9935 | 9955 | 10300 | 10500 | 10400 | 9990 | 9820 |
| Flexural Stress at Break | MPa | >150 | 157 | 158 | 157 | 160 | 154 | 158 | 157 |
| Izod Impact strength, Un-Notched, 23° C. | J/m | >470 | 493 | 505 | 518 | 499 | 474 | 476 | 568 |
| Flame Rating - UL 94, 23° C./48 hr | 0.80 mm | V0 | V0 | V0 | V0 | V0 | V0 | V0 | V0 |
| Flame Rating - UL 94, 70° C./168 hr | 0.80 mm | V0 | V0 | V0 | V0 | V0 | V0 | V0 | V0 |
| CTI (100) | V | | 600 | 600 | — | — | — | 600 | 600 |
| CTI PLC Rating | | | 0 | 0 | — | — | — | 0 | 0 |

TABLE 4

Formulation and physical properties of glass-filled, chlorine- and bromine-free, flame retardant poly(alkylene ester) compositions (Comparative Examples 1 to 2)

| Item Description | Unit | Targeted Performance | CE1 | CE2 |
|---|---|---|---|---|
| VALOX 315 | % | | 25.83 | 25.83 |
| VALOX 195 | % | | 25.83 | 25.83 |
| Glass Fiber | % | | 25.00 | 30.00 |
| MPP | % | | 5.00 | 5.00 |
| Al-DPA | % | | 12.50 | 12.50 |
| TSAN | % | | 0.50 | 0.50 |
| AO | % | | 0.15 | 0.15 |
| PETS | % | | 0.20 | 0.20 |
| ULTRATALC | % | | — | — |
| PEI (ULTEM 1010) | % | | 5.00 | — |
| HYTREL | % | | — | — |
| PARALOID EXL | % | | — | — |
| EEA | % | | — | — |
| IGETABOND E | % | | — | — |
| LOTADER | % | | — | — |
| Total | | | 100 | 100 |

| Test Description | Unit | | CE1 | CE2 |
|---|---|---|---|---|
| Flexural Modulus | MPa | >9800 | 9670 | 10100 |
| Flexural Stress at Break | MPa | >150 | 160 | 150 |
| Izod Impact strength, Un-Notched | J/m | >470 | 432 | 410 |
| Flame Rating - UL 94, 23° C./48 hr | 0.80 mm | V0 | V0 | V0 |
| Flame Rating - UL 94, 70° C./168 hr | 0.80 mm | V0 | V0 | V0 |

TABLE 4-continued

Formulation and physical properties of glass-filled,
chlorine- and bromine-free, flame retardant poly(alkylene
ester) compositions (Comparative Examples 1 to 2)

| | | | |
|---|---|---|---|
| CTI (100) | V | 250 | — |
| CTI PLC Rating | | 2 | — |

Discussion

The results shown in Tables 3 and 4 indicate that it is possible to make a glass-filled, chlorine- and bromine-free poly(alkylene ester) flame retardant composition containing a combination of elastomers with useful properties, namely, good flame retardance performance (i.e., a rating of V0 at 0.80 mm), higher CTI performance, improved impact properties and improved flexural properties, in comparison to a glass-filled, chlorine and bromine-free poly(alkylene ester) flame retardant composition that contains polyimide but no elastomers. More particularly, the results of Examples 1-7 show that the inventive compositions meet the minimum targeted performance properties, namely: (a) a flexural modulus greater than 9800 MPa, (b) a flexural stress greater than 150 MPa, (c) an unnotched impact strength greater than 470 Joules/meter, and (d) a rating of V0 at a thickness of 0.8 mm, measured in accordance with the UL 94 protocol. The compositions of Comparative Examples 1-2 do not meet these properties.

It can be seen that in Examples E1 to E7 in Table 3, when no ULTEM 1010 is present in the formulations and glass fiber content is 30%, the addition of combinations of elastomers (HYTREL and PARALOID EXL) at a 2 wt % level (E1 (1% HYTREL and 1% PARALOID EXL) and E2, E6, and E7 (1.5% HYTREL and 0.5% PARALOID EXL)) and a 2.5 wt % level (E3 and E5 (1.88% HYTREL and 0.63% PARALOID EXL)) and (E4 (1.25% HYTREL and 1.25% PARALOID EXL)) can improve mechanical properties such as unnotched Izod impact strength by at least 8.8%, while maintaining flame retardance performance (V0 at 0.8 mm) per UL 94, compared with CE1. Furthermore, the CTIs of E1, E2, E6, and E7 are also in much higher voltages than CE1: 600 V for E1, E2, E6, and E7 as compared to 250 V for CE1. This is equivalent to a 2 PLC rating increase. Furthermore, when less Al-DPA is used in E6 and E7 (11%) as compared with in CE1 (12.5%), a UL 94 V0 rating at 0.80 mm is still achieved. Especially in E7, where 0.5% ULTRATALC is present in the formulation, the unnotched impact strength (568 J/m) is largely improved from the 438 J/m observed for CE1, as well as the 476 J/m of E6.

As shown in the comparative examples (Table 4), CE1 is a 25 wt % glass and 5 wt % polyimide (ULTEM 1010)-filled, chlorine- and bromine-free poly(alkylene ester) flame retardant composition. CE2 is a 30 wt % glass-filled, chlorine- and bromine-free poly(alkylene ester) flame retardant composition with no polyimide (ULTEM 1010). When the 5 wt % ULTEM 1010 in CE1 is replaced with 5 wt % glass in CE2, the unnotched Izod impact strength of the formulation drops by 5% (from 432 to 410 J/m), even though the same V0 rating is achieved. The low impact strength of CE2 limits its use in applications such as electrical connectors and computer fans.

Comparative Examples 3-25

The purpose of Comparative Examples 3-25 is to compare the performance of compositions containing a single elastomer with compositions having a combination of elastomers, as well as the performance of compositions containing a combination of elastomers in amounts outside the inventive ranges.

Examples are prepared and tested as described above. The results for Comparative Examples CE3-CE25 are shown in Tables 5, 6, and 7.

TABLE 5

Formulation and physical properties of glass-filled, chlorine- and bromine-free,
flame retardant poly(alkylene ester) compositions (Comparative Example 3 to 12)

| Item Description | Unit | Targeted Performance | CE3 | CE4 | CE5 | CE6 | CE7 | CE8 | CE9 | CE12 |
|---|---|---|---|---|---|---|---|---|---|---|
| VALOX 315 | % | | 23.33 | 23.33 | 23.33 | 23.33 | 23.33 | 23.33 | 23.33 | 23.83 |
| VALOX 195 | % | | 23.33 | 23.33 | 23.33 | 23.33 | 23.33 | 23.33 | 23.33 | 23.83 |
| Glass Fiber | % | | 30.00 | 30.00 | 30.00 | 30.00 | 30.00 | 30.00 | 30.00 | 30.00 |
| MPP | % | | 5.00 | 5.00 | 5.00 | 5.00 | 5.00 | 5.00 | 5.00 | 5.00 |
| Al-DPA | % | | 12.50 | 12.50 | 12.50 | 12.50 | 12.50 | 12.50 | 12.50 | 11.00 |
| TSAN | % | | 0.50 | 0.50 | 0.50 | 0.50 | 0.50 | 0.50 | 0.50 | 0.50 |
| AO | % | | 0.15 | 0.15 | 0.15 | 0.15 | 0.15 | 0.15 | 0.15 | 0.15 |
| PETS | % | | 0.20 | 0.20 | 0.20 | 0.20 | 0.20 | 0.20 | 0.20 | 0.20 |
| ULTRATALC | % | | — | — | — | — | — | — | — | 0.50 |
| PEI (ULTEM 1010) | % | | — | — | — | — | — | — | — | — |
| HYTREL | % | | 5.00 | — | — | — | — | 2.50 | 3.75 | — |
| PARALOID EXL | % | | — | 5.00 | — | — | — | 2.50 | 1.25 | 1.25 |
| EEA | % | | — | — | 5.00 | — | — | — | — | — |
| IGETABOND E | % | | — | — | — | 5.00 | — | — | — | — |
| LOTADER | % | | — | — | — | — | 5.00 | — | — | — |
| | | | 100 | 100 | 100 | 100 | 100 | 100 | 100 | 100 |

TABLE 5-continued

Formulation and physical properties of glass-filled, chlorine- and bromine-free, flame retardant poly(alkylene ester) compositions (Comparative Example 3 to 12)

| Test Description | Unit | | CE3 | CE4 | CE5 | CE6 | CE7 | CE8 | CE9 | CE12 |
|---|---|---|---|---|---|---|---|---|---|---|
| Flexural Modulus | MPa | >9800 | 8570 | 9420 | 8820 | 8610 | 8370 | 9840 | 9700 | 9410 |
| Flexural Stress at Break | MPa | >150 | 119 | 137 | 126 | 143 | 138 | 147 | 144 | 147 |
| Izod Impact strength, Un-Notched, 23° C. | J/m | >470 | 442 | 398 | 412 | 461 | 452 | 464 | 482 | 494 |
| Flame Rating - UL 94, 23° C./48 hr | 0.80 mm | V0 | V0 | V0 | V0 | V0 | V0 | V0 | V0 | V0 |
| Flame Rating - UL 94, 70° C./168 hr | 0.80 mm | V0 | V0 | V0 | V0 | V0 | V1 | V1 | V0 | V0 | V2 |
| CTI (100) | V | | — | — | — | — | — | — | — | — |
| CTI PLC Rating | | | — | — | — | — | — | — | — | — |

TABLE 6

Formulation and physical properties of glass-filled, chlorine- and bromine-free, flame retardant poly(alkylene ester) compositions (Comparative Example 13 to 19)

| Item Description | Unit | Targeted Performance | CE13 | CE14 | CE15 | CE16 | CE17 | CE18 | CE19 |
|---|---|---|---|---|---|---|---|---|---|
| VALOX 315 | % | | 24.58 | 24.58 | 24.58 | 24.58 | 24.58 | 24.58 | 25.08 |
| VALOX 195 | % | | 24.58 | 24.58 | 24.58 | 24.58 | 24.58 | 24.58 | 25.08 |
| Glass Fiber | % | | 30.00 | 30.00 | 30.00 | 30.00 | 30.00 | 30.00 | 30.00 |
| MPP | % | | 5.00 | 5.00 | 5.00 | 5.00 | 5.00 | 5.00 | 5.00 |
| Al-DPA | % | | 12.50 | 12.50 | 12.50 | 12.50 | 12.50 | 12.50 | 11.00 |
| TSAN | % | | 0.50 | 0.50 | 0.50 | 0.50 | 0.50 | 0.50 | 0.50 |
| AO | % | | 0.15 | 0.15 | 0.15 | 0.15 | 0.15 | 0.15 | 0.15 |
| PETS | % | | 0.20 | 0.20 | 0.20 | 0.20 | 0.20 | 0.20 | 0.20 |
| ULTRATALC | % | | — | — | — | — | — | — | 0.50 |
| PEI (ULTEM 1010) | % | | — | — | — | — | — | — | — |
| HYTREL | % | | 2.50 | — | — | — | — | 1.25 | 1.88 |
| PARALOID EXL | % | | — | 2.50 | — | — | — | 1.25 | 0.63 |
| EEA | % | | — | — | 2.50 | — | — | — | — |
| IGETABOND E | % | | — | — | — | 2.50 | — | — | — |
| LOTADER | % | | — | — | — | — | 2.50 | — | — |
| | | | 100 | 100 | 100 | 100 | 100 | 100 | 100 |

| Test Description | Unit | | CE13 | CE14 | CE15 | CE16 | CE17 | CE18 | CE19 |
|---|---|---|---|---|---|---|---|---|---|
| Flexural Modulus | MPa | >9800 | 6460 | 9600 | 9250 | 9370 | 9190 | 10600 | 9860 |
| Flexural Stress at Break | MPa | >150 | 110 | 141 | 133 | 148 | 147 | 150 | 155 |
| Izod Impact strength, Un-Notched | J/m | >470 | 420 | 442 | 371 | 471 | 470 | 447 | 506 |
| Flame Rating - UL 94, 23° C./48 hr | 0.80 mm | V0 | V0 | V0 | V0 | V0 | V1 | V0 | V0 |
| Flame Rating - UL 94, 70° C./168 hr | 0.80 mm | V0 | V0 | V0 | V0 | V1 | V1 | V0 | V2 |
| CTI (100) | V | | — | — | — | — | — | — | — |
| CTI PLC Rating | | | — | — | — | — | — | — | — |

TABLE 7

Formulation and physical properties of glass-filled, chlorine- and bromine-free, flame retardant poly(alkylene ester) compositions (Comparative Example 20 to 25)

| Item Description | Unit | Targeted Properties | CE20 | CE21 | CE22 | CE23 | CE24 | CE25 |
|---|---|---|---|---|---|---|---|---|
| VALOX 315 | % | | 24.83 | 24.83 | 25.83 | 25.58 | 25.20 | 25.20 |
| VALOX 195 | % | | 24.83 | 24.83 | 25.83 | 25.58 | 25.20 | 25.20 |

TABLE 7-continued

Formulation and physical properties of glass-filled, chlorine- and bromine-free,
flame retardant poly(alkylene ester) compositions (Comparative Example 20 to 25)

| | | | | | | | |
|---|---|---|---|---|---|---|---|
| Glass Fiber | % | 30.00 | 30.00 | 30.00 | 30.00 | 30.00 | 30.00 |
| MPP | % | 5.00 | 5.00 | 5.00 | 5.00 | 5.00 | 5.00 |
| Al-DPA | % | 12.50 | 12.50 | 10.50 | 10.50 | 12.50 | 12.50 |
| TSAN | % | 0.50 | 0.50 | 0.50 | 0.50 | 0.50 | 0.50 |
| AO | % | 0.15 | 0.15 | 0.15 | 0.15 | 0.15 | 0.15 |
| PETS | % | 0.20 | 0.20 | 0.20 | 0.20 | 0.20 | 0.20 |
| ULTRATALC | % | — | — | — | 0.50 | — | — |
| PEI (ULTEM 1010) | % | — | — | — | — | — | — |
| HYTREL | % | 2.00 | — | 1.50 | 1.50 | 1.25 | — |
| PARALOID EXL | % | — | 2.00 | 0.50 | 0.50 | | 1.25 |
| EEA | % | — | — | — | — | — | — |
| IGETABOND E | % | — | — | — | — | — | — |
| LOTADER | % | — | — | — | — | — | — |
| | | 100 | 100 | 100 | 100 | 100 | 100 |

| Test Description | Unit | CE20 | CE21 | CE22 | CE23 | CE24 | CE25 |
|---|---|---|---|---|---|---|---|
| Flexural Modulus | MPa | >9800 | 9530 | 9760 | 10100 | 10200 | 8950 | 10200 |
| Flexural Stress at Break | MPa | >150 | 153 | 156 | 161 | 164 | 143 | 154 |
| Izod impact strength, Unnotched | J/m | >470 | 531 | 417 | 508 | 561 | 429 | 466 |
| Flame Rating, UL 94, 23° C./48 hr | 0.80 mm | V0 | V0 | V0 | V0 | V0 | V0 | V0 |
| Flame Rating, UL 94, 70° C./168 hr | 0.80 mm | V0 | V2 | V1 | V1 | V0 | V0 | V0 |
| CTI (100) | V | | — | — | 600 | 550 | — | — |
| CTI PLC Rating | | | — | — | 0 | 1 | — | — |

Discussion

The results shown in Tables 5, 6, and 7 (Comparative Examples 3-25) illustrate that use of a single elastomer, or two elastomers outside of a relatively narrow range does not meet the minimum targeted performance properties; namely these compositions do not exhibit the following combination of properties: (a) a flexural modulus greater than 9800 MPa, (b) a flexural stress greater than 150 MPa, (c) an unnotched impact strength greater than 470 Joules/meter, and (d) a rating of V0 at a thickness of 0.8 mm, measured in accordance with the UL 94 protocol. The compositions of Comparative Examples 1-2 do not meet these properties.

As shown in Table 5, when impact modifiers including ELVALOY, IGETABOND, LOTADER, HYTREL, and PARALOID EXL are used individually at a level of 5 wt %, the 30 wt % glass-filled, chlorine- and bromine-free poly (alkylene ester) flame retardant formulations (CE3 to CE7) show some disadvantages such as in low flexural modulus, low flexural stress at break, and low unnotched Izod impact strength. In CE6 and CE7, flame retardance performance is rated as V1. In CE8 to CE9 and CE12, where the addition of combinations of elastomers (HYTREL Elastomer and PARALOID EXL) at a level of 5 wt % is used, flexural stress at break is still less desirable, i.e., less than 150 MPa. In CE12, where 11% Al-DPA is used, the UL 94 rating at 0.80 mm is V1.

As shown in Table 6, when impact modifiers including ELVALOY, IGETABOND, LOTADER, HYTREL and PARALOID EXL are used individually at a level of 2.5 wt %, the 30% glass-filled, chlorine- and bromine-free poly(alkylene ester) formulations (CE13 to CE17) show some disadvantages such as in low flexural modulus, low flexural stress at break, and in some cases, low un-notched Izod impact strength. In CE16 and CE17, flame retardance performance is rated as V1. In CE18, where the addition of combinations of elastomers (1.25% HYTREL and 1.25% PARALOID EXL) at a level of 2.5 wt % is used, flexural stress at break is still less desirable, i.e., less than 150 MPa. In CE19, where 11% Al-DPA is used, the UL 94 rating at 0.80 mm is V2.

As shown in Table 7, when impact modifiers including HYTREL and PARALOID EXL are used individually at a level of 2.0 wt %, the 30% glass-filled, chlorine- and bromine-free poly(alkylene ester) formulations (CE20 and CE21) show some disadvantages such as in low flexural modulus and failure to meet V0 flame retardance at 0.80 mm. When impact modifiers including HYTREL and PARALOID EXL are used individually at a level of 1.25 wt %, the 30% glass-filled, chlorine- and bromine-free poly(alkylene ester) flame retardant formulations (CE24 and CE25) show some disadvantages such as low flexural modulus (CE24) and low unnotched Izod impact strength, i.e., less than 470 J/m. In CE22 to CE23, containing 2 wt % of a combination of elastomers (1.50% HYTREL and 0.5% PARALOID EXL) and 10.5 wt % of Al-DPA, the formulations show either insufficient UL 94 rating (CE22) or less desirable CTI voltage, i.e., less than 600V (CE23).

All patents and applications cited herein are incorporated by references. While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic polyester composition comprising, based on the weight of the composition, a chlorine- and bromine-free combination of:
   (a) from 40 to 60 wt % of poly(butylene terephthalate);
   (b) from 25 to 35 wt % of a glass fiber filler;

(c) from 2 to 8 wt % of a flame retardant synergist selected from the group consisting of melamine polyphosphate, melamine cyanurate, melamine pyrophosphate, melamine phosphate, and combinations thereof;

(d) from more than 10 to 15 wt % a phosphinate of formula (I)

$$[(R^1)(R^2)(PO)-O]^-_m M^{m+} \qquad (I),$$

a diphosphinate of formula (II)

$$[(O-POR^1)(R^3)(POR^2-O)]^{2-}_n M^{m+}_x \qquad (II), \text{and/or}$$

a polymer derived from the phosphinate of formula (I) or the diphosphinate of the formula (II), wherein $R^1$ and $R^2$ are identical or different and are H, linear or branched $C_1$-$C_6$ alkyl, or $C_6$-$C_{10}$ aryl; $R^3$ is $C_1$-$C_{10}$, linear or branched alkylene, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or B; m is 1, 2, 3 or 4; n is 1, 2, or 3; and x is 1 or 2;

(e) at least 1% to less than 5 weight % of impact modifier component comprising a combination of (i) a poly(ether-ester) elastomer and (ii) a core-shell (meth)acrylate impact modifier;

wherein the poly(ether-ester) elastomer comprises long-chain ester units of formula (III):

$$\text{-GOCOR'COO-} \qquad (III);$$

and short-chain ester units having units of formula (IV):

$$\text{-DOCOR'COO-} \qquad (IV),$$

wherein R' is a divalent aromatic radical remaining after removal of carboxyl groups from terephthalic acid, isophthalic acid, or a combination of terephthalic acid and isophthalic acid; G is a divalent polyalkylene oxide radical remaining after removal of terminal hydroxyl groups from a poly(alkylene oxide) glycol having a number-average molecular weight of 100 to 2500; and D is a divalent alkylene radical remaining after removal of hydroxyl groups from aliphatic diols having a molecular weight from 62 to 286; and wherein the core-shell meth(acrylate) impact modifier has a crosslinked poly(butyl acrylate) core with a grafted poly(methyl methacrylate) shell;

(f) from more than 0 to 5 wt % poly(tetrafluoroethylene) encapsulated by a styrene-acrylonitrile copolymer; and (g) from more than 0 wt % to 2 wt % of a stabilizer;

wherein the thermoplastic polyester composition contains 0 to less than 3 wt % of a polyetherimide; and wherein an article molded from the composition exhibits (a) a flexural modulus that is more than 9800 to less than or equal to 20000 MPa, measured in accordance with ASTM D790, (b) a flexural stress that is more than 150 to less than or equal to 190 MPa, measured in accordance with ASTM D790, (c) an unnotched impact strength that is more than 470 to less than or equal to 700 Joules/meter, measured at 23° C. in accordance with ASTM D256, and (d) a V0 rating at 0.8 mm, measured in accordance with UL 94.

2. An article comprising the thermoplastic polyester composition of claim 1.

3. The article of claim 2, wherein the article is selected from the group consisting of computer fans, electrical connectors, automotive battery housings, and lighting sockets.

4. The thermoplastic polyester composition of claim 1, wherein the poly(ether-ester) elastomer is a poly(butylene terephthalate-polytetrahydrofuran) block copolymer.

5. The thermoplastic polyester composition of claim 1, wherein the phosphorus flame retardant is present in an amount ranging from 11 to 12.5 wt %.

6. The thermoplastic polyester composition of claim 1, wherein the impact modifier is present in an amount ranging from 2 to 2.5 wt %.

7. The thermoplastic polyester composition of claim 1, wherein the composition contains no polyetherimide, and an article extruded from the composition exhibits a CTI (Comparative Tracking Index) of 600 volts.

8. The thermoplastic polyester composition of claim 1, wherein the flame retardant comprises the phosphinate of formula (I).

9. The thermoplastic polyester composition of claim 1, wherein the thermoplastic polyester composition contains less than 1 wt % of a polyetherimide.

10. The thermoplastic polyester composition of claim 1, wherein the impact modifier component comprises from 2 to 4 wt % of a combination of a poly(butylene terephthalate-polytetrahydrofuran) block copolymer and a core-shell (meth)acrylate impact modifier having a crosslinked poly(butyl acrylate) core with a grafted poly(methyl methacrylate) shell.

11. A thermoplastic polyester composition comprising, based on the weight of the composition, a halogen-free combination of:

(a) from 40 to 60 wt % of poly(butylene terephthalate);

(b) from 25 to 35 wt % glass fiber filler;

(c) from 2 to 8 wt % of a flame retardant synergist selected from the group consisting of melamine polyphosphate, melamine cyanurate, melamine pyrophosphate, melamine phosphate, and combinations thereof;

(d) from more than 10 to 15 wt % a phosphinate of formula (I)

$$[(R^1)(R^2)(PO)-O]^-_m M^{m+} \qquad (I),$$

a diphosphinate of formula (II)

$$[(O-POR^1)(R^3)(POR^2-O)]^{2-}_n M^{m+}_x \qquad (II), \text{and/or}$$

a polymer derived from the phosphinate of formula (I) or the diphosphinate of the formula (II), wherein R' and $R^2$ are identical or different and are H, or linear or branched $C_1$-$C_6$ alkyl; $R^3$ is $C_1$-$C_{10}$, linear or branched alkylene; M is aluminum; m is 3; n is 3; and x is 1 or 2;

(e) at least 1 to less than 5 wt % of impact modifier component comprising a combination of (i) a poly(butylene terephthalate-polytetrahydrofuran) block copolymer and (ii) a core-shell (meth)acrylate impact modifier having a crosslinked poly(butyl acrylate) core with a grafted poly(methyl methacrylate) shell;

(f) from more than 0 to 5 wt % poly(tetrafluoroethylene) encapsulated by a styrene-acrylonitrile copolymer; and (g) from more than 0 wt % to 2 wt % of a stabilizer;

wherein the thermoplastic polyester composition contains 0 to less than 2 wt % of a polyetherimide; and wherein an article molded from the composition exhibits (a) a flexural modulus that is more than 9800 to less than or equal to 20000 MPa, measured in accordance with ASTM D790, (b) a flexural stress is more than 150 to less than or equal to 190 MPa, measured in accordance with ASTM D790, (c) an unnotched impact strength that is more than 470 to less than or equal to 700 Joules/meter, measured at 23° C. in accordance with ASTM D256, and (d) a V0 rating at 0.8 mm, measured in accordance with UL 94.

12. An article comprising the composition of claim 11.

13. The article of claim 12, wherein the article is selected from the group consisting of computer fans, electrical connectors, automotive battery housings, and lighting sockets.

* * * * *